United States Patent [19]

Brenner

[11] 3,852,412

[45] Dec. 3, 1974

[54] NITRIC ACID RECOVERY SYSTEM

[75] Inventor: Walter Brenner, Teaneck, N.J.

[73] Assignee: Brunswick Corporation, Skokie, Ill.

[22] Filed: Oct. 23, 1973

[21] Appl. No.: 408,324

[52] U.S. Cl................. 423/390, 423/143, 423/633, 134/12, 203/13
[51] Int. Cl............................................ C01b 21/46
[58] Field of Search .................. 423/390, 143–144, 423/633; 134/12–13; 203/13, 96

[56] References Cited
UNITED STATES PATENTS

| | | | |
|---|---|---|---|
| 2,344,004 | 3/1944 | Six | 423/390 X |
| 2,428,221 | 9/1947 | Hudson | 134/12 |
| 2,643,204 | 6/1953 | Mancke | 423/390 X |
| 3,479,254 | 11/1969 | Miserlis | 203/13 |

FOREIGN PATENTS OR APPLICATIONS 1,076,025  7/1967  Great Britain ..................... 423/390

Primary Examiner—G. O. Peters

[57] ABSTRACT

A method for recovering nitric acid solutions and ferric oxide from acidic solutions of ferric nitrate, including the steps of adjusting the nitric acid concentration to the nitric acid-water azeotrope and distilling the solution under such azeotropic conditions.

4 Claims, No Drawings

NITRIC ACID RECOVERY SYSTEM

BACKGROUND OF THE INVENTION

1. Field of the Invention

The present invention relates to a method for recovering nitric acid from acidic solutions of ferric nitrate. Further, the present invention is directed to the recovery of nitric acid in essentially quantitative amounts from e.g., pickling or leaching solutions. More specifically the present invention is directed to low temperature hydrolysis and distillation of acidic ferric nitrate solutions under conditions where nitrogen oxides such as $NO$, $NO_2$ and $N_2O_5$ are not evolved in any substantial amounts.

2. Summary of the Prior Art

Disposal of nitric acid waste solutions produced by processes such as etching or leaching of various ferrous metals has long been a significant problem. Further, with the increased emphasis on environmental quality, efficient and safe disposal of such waste has become even more important. Ferric nitrate presents a significant problem along this line since it is water soluble, and the aqueous solutions thereof require further treatment since they are not desirable and may not be allowed in effluent waste streams. Further, recycling of nitric acid provides for more economical process operation and thus a process allowing such recycling is even more desirable.

Systems such as thermal decomposition, reduction, alkali neutralization, and phosphoric acid treatment have been suggested in the prior art to alleviate this problem, but such processes appear to have significant drawbacks. Specifically, high temperatures have been used to decompose the ferric nitrate but nitrogen oxides have been formed in this type of thermal decomposition process. Such gasses are known to be poisonous and, in view of recent legislation, must be eliminated. Thus they are often converted into nitric acid. However, in such processes, very large expensive equipment is essential since great amounts of the nitrogen oxides are produced by the decomposition. Two processes exemplary of this type are disclosed in U.S. Pat. Nos. 2,344,004 and 2,737,445. An alternative process utilizes a reducing atmosphere at a temperature of about 2,000° to 2,250°F. to decompose the ferric nitrate to nitrogen and ferric oxide but this process requires a furnace, fuel for the furnace, and a reducing atmosphere. Further, this type of reaction does not result in very high conversion rates and is also quite expensive with large equipment normally required without the benefit of recovery of the nitric acid.

Hydroxides of sodium or calcium are often used in the alkali neutralization processes. However, these processes produce iron oxides which are quite often gelatinous and thus very difficult to treat. Flocculation, precipitation and centrifuging are utilized but these steps also increase process cost. In addition, the sodium and calcium nitrates formed are water soluble and must be subjected to additional processing to render the effluent material acceptable.

Generally, processes involving the use of phosphoric acid to form iron phosphates are not economical since phosphoric acid is considerably more expensive than nitric acid. Further, the ferric phosphates produced have very limited commercial value and complete precipitation of the ferric phosphates can only be realized after considerable digestion of the reacting mixtures at elevated temperatures with filtration or centrifuging required for the separation. The nitric acid produced is quite dilute and thus, in view of the high equipment cost and the questionable use of the final nitric acid product, this process also is uneconomical.

Thus, the processes of the prior art generally are lacking in at least one important aspect, i.e., either they are very expensive, don't produce useful products (such as iron oxide and nitric acid), have significant equipment problems, or present ecological problems.

SUMMARY OF THE INVENTION

All of the above described process disadvantages have been overcome by the process of the present invention. The present process makes possible the essentially quantitative recovery of nitric acid values from the ferric nitrate which contains free nitric acid.

Thus it is an object of the present invention to provide a method of disposing acidic ferric nitrate solutions produced, for example, in nitric acid etching of ferrous metals.

Another object of the present invention is to provide a process for the recovery of nitric acid from such acidic solutions without the evolution of the gaseous nitrogen oxides.

One feature of the present invention is the provision of a process whereby essentially quantitative recovery of nitric acid from acidic ferric nitrate solutions is possible and thus a reduction in process costs by allowing for recycling of the nitric acid is provided.

Finally, a feature of the present invention is the provision of safe and economical process for the disposition of acidic ferric nitrate solutions.

DESCRIPTION OF THE PREFERRED EMBODIMENTS

The present invention provides a process for treating acidic ferric nitrate solutions to produce substantially pure nitric acid and ferric oxide wherein the acid concentration of the solution to be treated is adjusted to the nitric acid/water azeotrope by e.g., flash evaporation or vacuum distillation, and then the azeotropic solution is distilled.

The process of the present invention utilizes ferric nitrate containing solutions which have been produced by, for example, etching, leaching, and pickling processes. The process is particularly adaptable for use in recovering the solution produced in the leaching step of processes such as the one described in U.S. Pat. No. 3,404,039 to J. A. Roberts et al., where iron is the matrix material. These solutions may contain small amounts of other metal nitrates such as copper or nickel nitrate. They are subjected to at least a two-step process which adjusts the nitric acid concentration of the solution to the nitric acid-water azeotrope and then distills this azeotrope to separate the remainder of the nitric acid, including that in the ferric state, without the evolution of any substantial amounts of nitrogen oxides.

The first step of the process of the present invention may be effected by, for example, flash evaporation, vacuum distillation or low temperature distillation. When distillation is utilized in the step, the distillate temperature should not surpass the boiling point of the azeotrope by a significant amount, e.g., up to about 150°C., as higher temperatures result in the formation of gaseous nitrogen oxides. This temperature maximum is preferably about 140°C. When atmospheric pressure is effected, most preferably the distillate temperature is gradually increased to a point where it approaches 140°C.; however, lower temperatures are necessary when vacuum distilling. Thus it is very important that the temperature of the distillate be maintained at or below the azeotropic boiling point to avoid the emission of nitrogen oxides as gasses. In distilling the solution in this manner, the hydrolysis of the ferric nitrate solution to produce nitric acid and ferric oxide is effected at a temperature where substantially no nitrogen oxide gasses are formed. The maximum boiling azeotrope of a binary mixture of water and nitric acid contains about 38 mole percent nitric acid and boils at about 122° C. at one atmosphere.

The second step of the process distills this azeotropic solution containing the ferric material and separates a solution of near azeotropic concentrations of nitric acid and water. Thus it produces water insoluble ferric oxide without the production of substantial amounts of nitrogen oxides.

When utilizing flash distillation, a predetermined amount of the solution may be flashed off prior to conducting the final distillation steps. However, this flash distillation step cannot be sufficient to cause the precipitation of any of the components which would contain the nitrates since the remaining solution must be transferred to the batch distillation unit.

The acidic ferric nitrate solutions of the present invention may be from various sources, for example, etching or otherwise reacting a ferrous metal or metal oxide with nitric acid or aqueous solutions containing nitric acid produce such acidic ferric nitrate solutions. One of the products of the process of the present invention is a solution of nitric acid which may be recycled to e.g., further etching steps. The water insoluble ferric oxide product, on the other hand, can be employed in a variety of industrial uses, such as pigments, magnetic tape, etc.

In carrying out the process of the present invention, it appears that the ferric nitrate in the solution reacts with water to produce a precipitate of ferric hydroxide plus nitric acid and that the ferric hydroxide, under the heat provided in the second step, hydrolyzes to ferric oxide plus further water. Water is required in the present process in order to carry out the first reaction and the prompt removal of the nitric acid is necessary in order to prevent the formation of the nitrogen oxides. The thermal stability of the nitric acid formed is probably enhanced by the presence of a sufficient amount of water to permit the formation of the azeotrope which is up to 68 percent by weight nitric acid.

Thus in the process of the present invention a solution containing nitric acid and ferric nitrate is treated to adjust the nitric acid concentration of the solution to a point where it approaches the azeotropic concentration. That is, the overall amounts of water and nitric acid which are, or could be, produced by the reactions occurring in the process of the present invention are adjusted approximately to this azeotropic condition. This can be done by, e.g., addition of water to a solution of higher than azeotropic acid content, removal of water from a solution of lower than azeotropic acid concentration, or by the addition of acid to a solution of lower than azeotropic acid concentration. Since free water and ferric nitrate will most probably be present in the acidic solutions, all of the nitrate containing material should be considered in determining the concentrations at this azeotropic point. After this adjustment has been effected, the solution is azeotropically distilled to remove the constant boiling mixture and produce the ferric oxide residue. By means of this process, substantially no nitrogen oxides are emitted and thus no emission control problems are incurred.

The following examples will serve to indicate the process of the present invention but are cited as exemplary only and are not intended to limit the scope of the invention.

EXAMPLE I

A 250 ml. Pyrex glass flask was thoroughly cleaned and dried and weighed. The weight was then recorded. A solution containing 105 grams of $Fe(NO_3)_3 \cdot 9H_2O$, 21.5 grams of 70 percent nitric acid and 235 grams of water was prepared in the flask. The resulting solution was a uniform brown color. The flask and its contents were again weighed and the weight recorded. The contents of the flask were distilled utilizing a heated oil bath and the distillate collected in a receiving flask. The solution was heated during distilling to a temperature of about 102°C. This was slowly increased as the distillation proceeded. After the distillate temperature reached about 120°C., it was maintained at that temperature for a period of three hours and 20 minutes after the first drop of condensate appeared. The Pyrex flask then contained a solid brown, powdery residue which weighed 24.2 grams, while the distillate weighed 126.8 grams. An analysis of distillate indicated that it contained 46.5 percent nitric acid, since the specific gravity was 1.2852 at 22.4°C. representing a recovery of over 95 percent of the nitrate values in the solution. The residue contained over 90 percent water insoluble material, predominently ferric oxide.

EXAMPLE II

A solution containing 1803.4 grams of ferric nitrate/nitric acid etching waste acid solution was distilled in a 3-liter flask using a water cooled condenser. The solution contained 29 percent by weight anhydrous ferric nitrate and 3 percent by weight nitric acid. The first drop of condensate appeared at 114°C. and, as in Example I, the vapor temperature continued to increase as the distillation progressed. After about 3 ½ hours, the distillate vapor temperature reached about 140°C. and distillation was terminated. At this point, a solid reddish-brown residue, which weighed 238 grams, remained in the flask. The total amount of condensate was 1555.6 grams, indicating about 10 grams of waste material lost during the process. The clear condensate contained approximately 33 ½ percent by weight nitric acid and the residue contained 64 percent by weight ferric oxide. An equivalent weight of water was added to the residue and distillation continued for approximately one-half hour at a temperature of 130°–145°C. After this step, the ferric oxide content increased to more than 90 percent and the resulting nitrate recovery was 91.5 percent.

EXAMPLE III 1,000 grams of a solution containing 212 grams of $Fe(NO_3)_3 \cdot 9H_2O$ and 275 grams of 70 % $NHO_3$ were flash evaporated under vacuum until dried, which took about 2 ½ hours. The distillate obtained weighed 866.5 grams and the residue weighed 129.5 grams. The nitric acid concentration of the distillate was about 26.5 by weight. The residue was diluted with 202 grams of water and subjected to conventional atmospheric pressure distillation. During this 2 ½ hour distillation step, the maximum vapor temperature was 120°C. This distillation produced 281.2 grams of 17 percent by weight nitric acid and 46 grams of residue. Thus the total nitrate recovery was 95.6 percent based on the original charge.

EXAMPLE IV 1,000 grams of the solution utilized in Example III was subjected to flash evaporation under vacuum to about 50 percent of its original volume. The evaporation took 1 ½ half hours and produced a distillate which weighed 1425.7 grams and contained 12 percent by weight nitric acid. The liquid residue was subjected to further distillation for 2 ½ hours and the resulting distillate combined with the first step distillate. In this process, over 95 percent of the nitrate values present in the original solution were recovered.

EXAMPLE V

The recovered nitric acid from Example II was diluted with water to an acceptable concentration and utilized in an etching operation at 160°F. for 3 ½ minutes. The resulting etching solution was found to perform as well as freshly prepared nitric acid etching solutions. Thus it can be seen that the nitric acid recovered by the process of the present invention is sufficiently pure for recycle use in etching ferrous materials.

From the above examples, it can be seen that by the process of the present invention nitric acid values can be recovered from acidic ferric nitrate solutions without the production of significant amounts of gaseous nitrogen oxides. Moreover, the process of the present invention allows such recovery without the use of expensive equipment, does not require additional chemicals and directly produces useful products.

What is claimed:

1. A method for treating aqueous nitric acid solutions containing ferric nitrate to produce substantially pure nitric acid and ferric oxide wherein substantially no insoluble nitrogen oxide gases are evolved comprising:
   a. adjusting the nitric acid concentration to the nitric acid-water azeotrope, and
   b. distilling the solution under nitric acid azeotropic conditions.

2. The method of claim 1 wherein said adjusting step is by flash evaporation.

3. The method of claim 1 wherein said adjusting step comprises atmospheric distillation at a temperature of up to 135°C. to produce a solid residue, followed by the step of the addition of sufficient water to said residue to provide said azeotropic concentration.

4. The process of claim 1 wherein said adjusting step comprises vacuum distillation.

* * * * *